(12) United States Patent
Zeung et al.

(10) Patent No.: US 9,383,772 B2
(45) Date of Patent: *Jul. 5, 2016

(54) DOCKING STATION WITH KVM SWITCH

(71) Applicants: Ping-Shun Zeung, Taipei (TW); Johnny Chen, Taipei (TW)

(72) Inventors: Ping-Shun Zeung, Taipei (TW); Johnny Chen, Taipei (TW)

(73) Assignee: I/O INTERCONNECT, LTD., Santa Ana, CA (US)

(*) Notice: Subject to any disclaimer, the term of this patent is extended or adjusted under 35 U.S.C. 154(b) by 372 days.

This patent is subject to a terminal disclaimer.

(21) Appl. No.: 13/937,161

(22) Filed: Jul. 8, 2013

(65) Prior Publication Data

US 2014/0344494 A1 Nov. 20, 2014

Related U.S. Application Data

(63) Continuation-in-part of application No. 13/896,282, filed on May 16, 2013, now Pat. No. 9,237,217.

(51) Int. Cl.
G06F 1/16 (2006.01)
H04M 1/04 (2006.01)
G06F 3/02 (2006.01)
G06F 3/023 (2006.01)

(52) U.S. Cl.
CPC .............. *G06F 1/1632* (2013.01); *G06F 3/023* (2013.01); *G06F 3/0227* (2013.01)

(58) Field of Classification Search
None
See application file for complete search history.

(56) References Cited

U.S. PATENT DOCUMENTS

2006/0195637 A1* 8/2006 Zhang ................... G09G 5/003
710/72

* cited by examiner

*Primary Examiner* — Idriss N Alrobaye
*Assistant Examiner* — Dayton Lewis-Taylor

(57) ABSTRACT

A dock for connecting a smartphone to a display and peripherals is disclosed. The dock transfers audio/video data to a display, establishes a wireless link with peripherals and possesses a KVM function. The dock has a controller with a switch, a wireless communication module, a USB hub, a relay, two USB connectors, a, USB switch, an AV converter, an AV switch, and two AV connectors. The relay normally connects AV data from the smartphone to the AV converter. The controller switches the relay while the switch is being operated, the wireless communication module establishes the wireless link with the smartphone. And the USB switch and AV switch can switch one of an external computer and a smartphone to be connected with the display and peripherals.

21 Claims, 10 Drawing Sheets

US 9,383,772 B2

DOCKING STATION WITH KVM SWITCH

CROSS-REFERENCE TO RELATED APPLICATIONS

This application is a continuation-in-part of U.S. patent application Ser. No. 13/896,282, filed May 16, 2013, pending.

BACKGROUND OF THE INVENTION

1. Technical Field

The invention relates to docking stations and KVM (Keyboard/Video/Mouse) switches, particularly to a combination of a docking station and a KVM switch.

2. Related Art

A smartphone is a mobile phone built on a mobile operating system, with more advanced computing capability connectivity than a conventional cellular phone. In essence, a smartphone is a computer-based cellular phone. As a result, more and more users treat a smartphone as a mixture of a cellular phone and a laptop or tablet computer.

There must be a rechargeable battery, a touchscreen panel and a connection port in a smartphone. When a smartphone is used as a laptop computer at home or office, a docking station is needed for charging battery, data communication and connecting human interface devices (HIDs) such as a keyboard and mouse. Also, an external display much larger than the touchscreen panel of a smartphone is required by most users.

Generally, a smartphone is provided with only one communication port, for example, a micro-USB port. For both input/output bidirectional data communication and audio/video unidirectional data transmission, some smartphones are provided with a micro-USB port with a built-in mobile audio/video interface such as the Mobile High-Definition Link (MHL) or the Mobility DisplayPort (MyDP) interface.

However, such an MHL-enabled or MyDP-enabled micro-USB port has to cease its USB functions while the MHL or MyDP function is being activated, and vice versa. In more detail, a user cannot use the MHL-enabled or MyDP-enabled micro-USB port to connect a keyboard, mouse or any other USB-HIDs when the port is connected to an external display. The only solution to simultaneously connect an external display and HIDs is to wirelessly connect HIDs via BLUETOOTH and to wiredly connect an external display via the MHL-enabled or MyDP-enabled micro-USB port. This is inconvenient and complicated for users. Furthermore, BLUETOOTH HIDs are much more expensive than general USB-HIDs.

There is some smartphone manufacture to provide a smartphone product with a proprietary hybrid interface connector that combines two sub-connectors—one for audio/video data transmission and the other one for USB data communication. However, such a proprietary connector lacks compatibility with other smartphone or peripheral manufactures. Users' selectivity is seriously limited.

Some users prefer using a single set of keyboard, display and mouse to be selectively connected with two or more computers. Some users may want the peripheral devices which connect with a docking station to be used by a desktop or laptop computer. Under the circumstances, a docking station with a KVM switch is required.

SUMMARY OF THE INVENTION

An object of the invention is to provide a dock station with a KVM switch, which can simultaneously operatively link an external display and USB devices with a smartphone and a computer and allows a user to control the computer and smartphone from the display and USB devices.

To accomplish the above object, the docking station with a KVM switch of the invention includes a controller with a switch, a wireless communication module, a universal serial bus (USB) hub, a relay, a USB switch, a first USB connector, a second USB connector, an audio/video (AV) converter, an AV switch, a first AV connector, and a second AV connector.

The wireless communication module is coupled to the controller and capable of establishing a wireless link with an external portable electronic device. The wireless communication module is coupled to the controller. The relay has a control terminal and multiple rows of change-over contacts. Each row of change-over contacts has a common terminal, a normally-open contact and a normally-closed contact, and the control terminal and the normally-open contacts are coupled to the controller. The first USB connector is coupled to the common terminals of the relay for connecting the external portable electronic device. The USB switch has one common end and two option ends for switching either of the two option ends to the common end, and one of the two option ends is coupled to the controller. The USB hub is coupled to the common end of the USB switch. The second USB connector is coupled to another one of the two option ends of the USB switch for connecting USB signals from an external computer. The AV converter is coupled to the normally-closed contacts of the relay for converting first AV data into second AV data. The AV switch has two AV inputs and one AV output for switching one of the two AV inputs to the AV output, and one of the two AV inputs is coupled to the AV converter. The first AV connector is coupled to another one of the two AV inputs of the AV switch for inputting a third AV data from the external computer. The second AV connector is coupled to the AV output of the AV switch for outputting either of the second AV data and the third AV data. The relay normally connects the first USB connector to the AV converter for transferring the first AV data from the external portable electronic device to the AV converter. The controller makes the relay switch through the control terminal while the switch is being operated, and then the controller links the external portable electronic device connected to the first USB connector, and the wireless communication module establishes the at least one wireless link with the external portable electronic device.

DETAILED DESCRIPTION OF THE INVENTION

Figure 1:
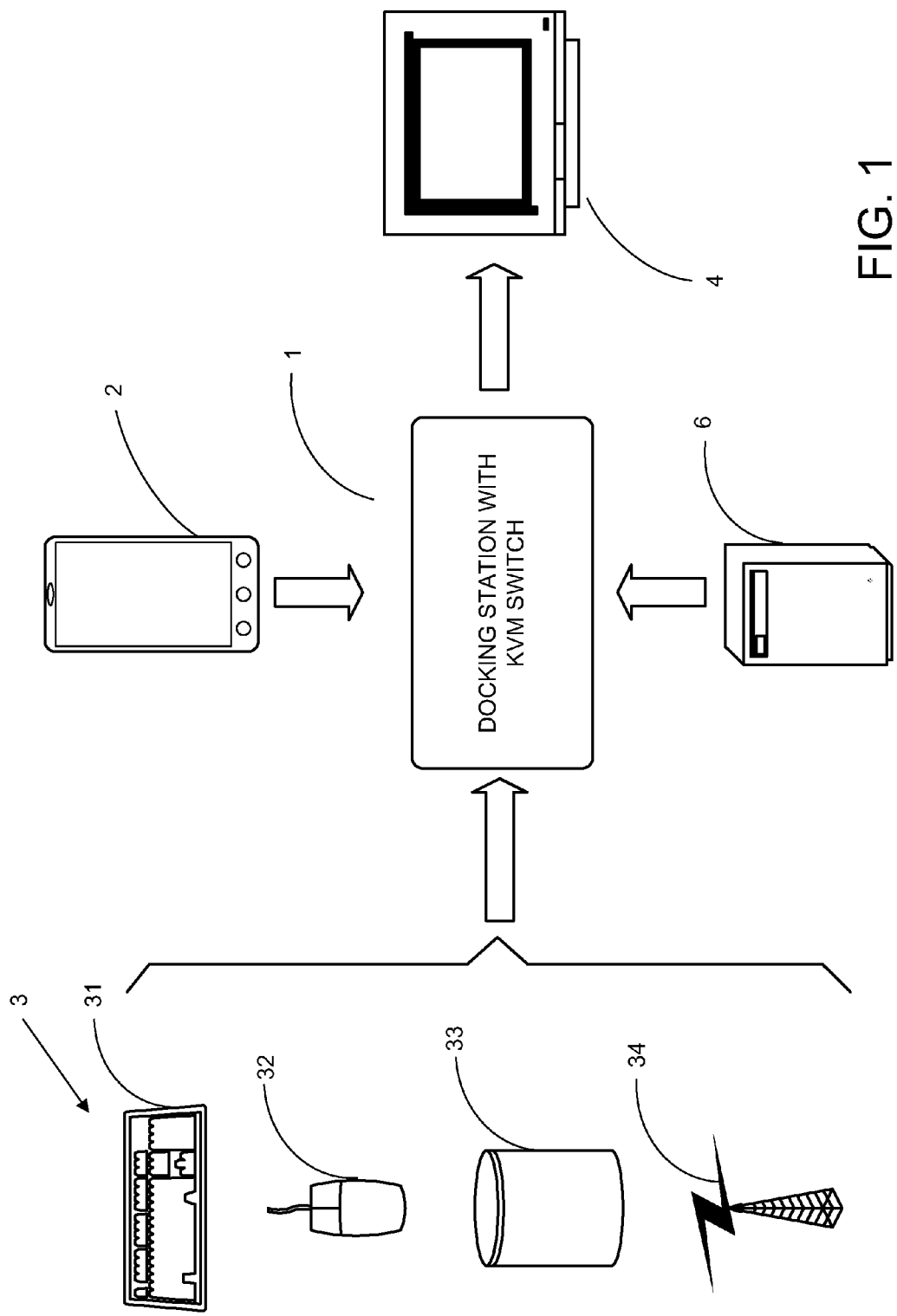
FIG. 1 is a schematic view of the invention in use.

Please refer to FIG. 1, which depicts topology of the docking station of the invention in use. As shown, the docking station 1 is materially connected with a portable electronic device such as a smartphone 2, a display 4, a computer 6 and USB devices 3 such as a keyboard 31, mouse 32, hard disk drive 33 and Wi-Fi access point 34. The docking station 1 can simultaneously output audio/video (AV) data to the display 4 and access the USB devices 3. Of course, the smartphone 2 must be provided with a micro-USB connector with a mobile AV interface such as the Mobile High-Definition Link (MHL) standard or the Mobility DisplayPort (MyDP) standard. Also, the docking station 1 can switch either of the smartphone 2 and the computer 6 to connect with the USB devices 3 and the display 4, just like a KVM (keyboard/video/mouse) switch.

Figure 2:
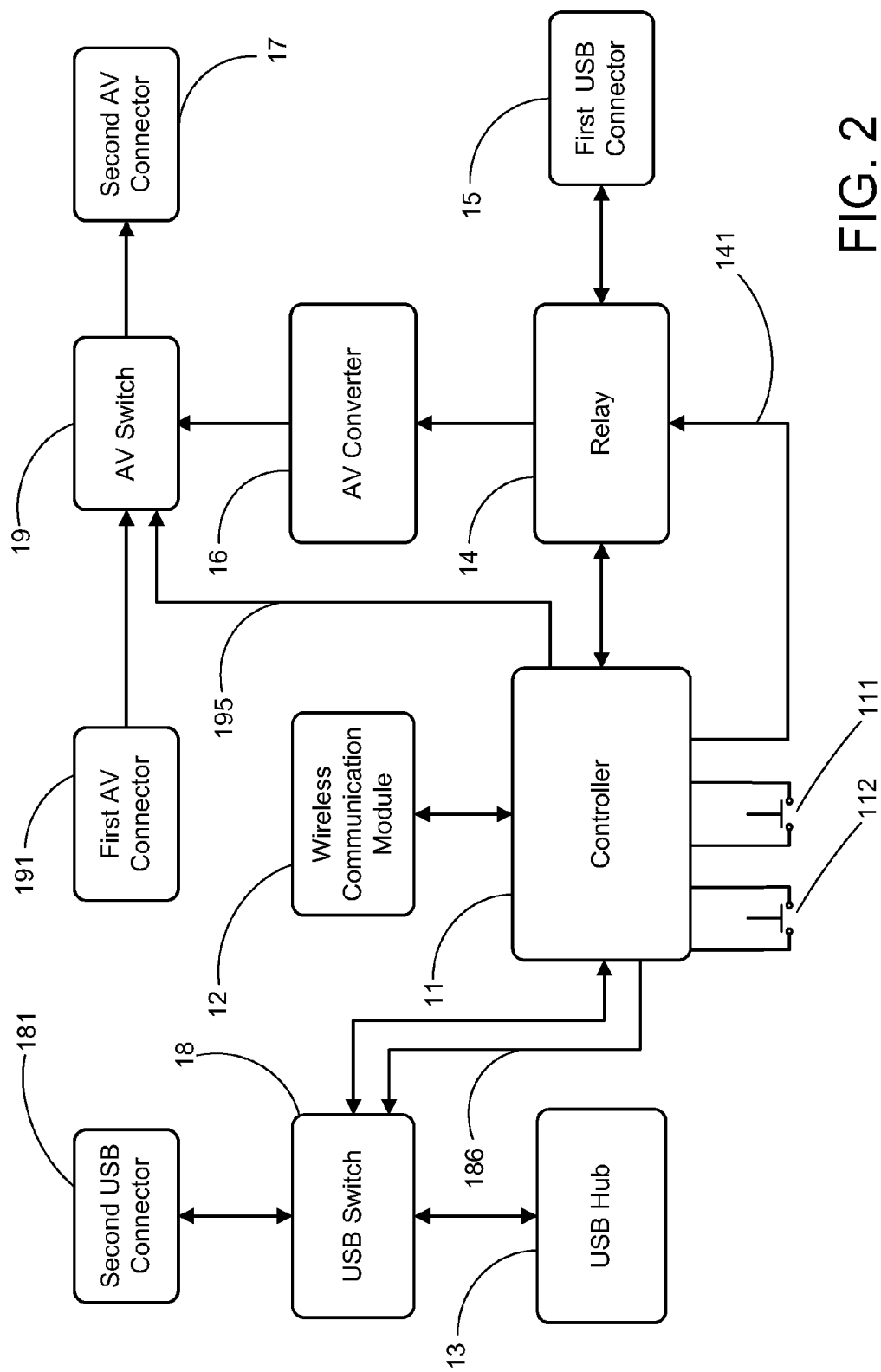
FIG. 2 is a block diagram of the invention.

FIG. 2 shows a block diagram of the docking station 1 of the invention. As shown, the docking station 1 includes a controller 11 with a linking switch 111 and a changing switch 112, a wireless communication module 12, a universal serial bus (USB) hub 13, a USB switch 18, a relay 14, a first USB connector 15, a second USB connector 181, an audio/video (AV) converter 16, an AV switch 19, a first AV connector 191 and a second AV connector 17.

The controller 11 may be an ARM SoC (System-on-Chip) processor. The linking switch 111 connected to the controller 11 may be a normally-open push-button switch. The wireless communication module 12 is coupled to the controller 11 and capable of establishing two wireless links with the smartphone 2. Preferably, the wireless communication module 12 is provided with a BLUETOOTH interface and a Wi-Fi interface. Accordingly, the two wireless links are compliant with the BLUETOOTH standard and the Wi-Fi standard.

Figure 3:
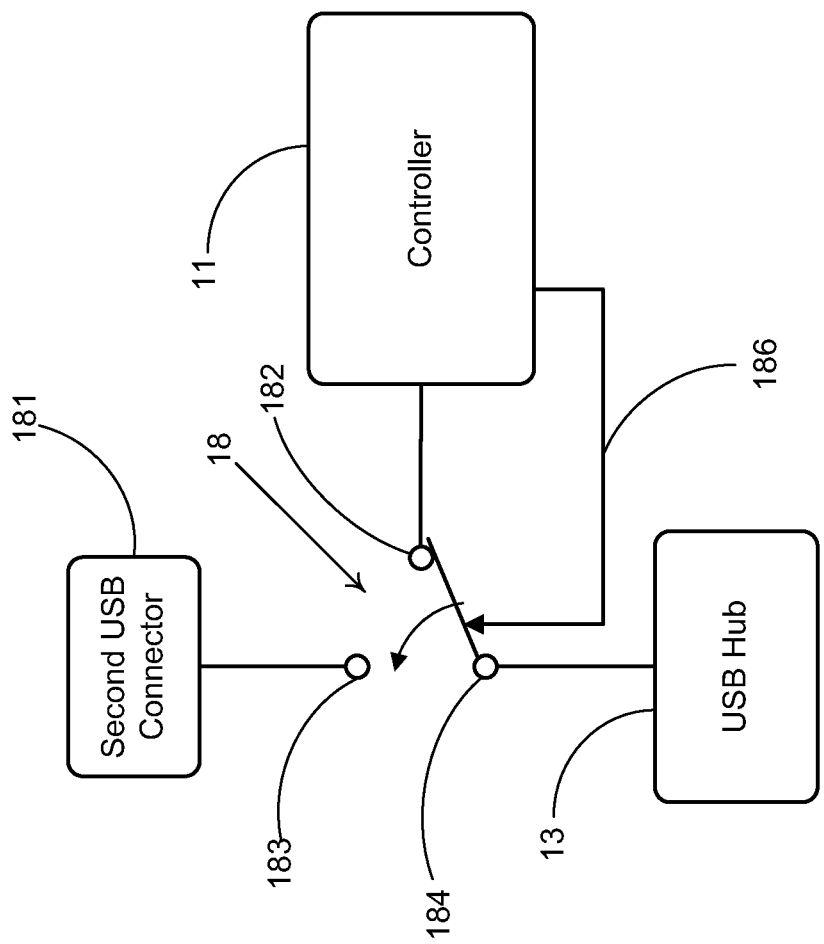
FIG. 3 is a schematic view showing the wiring of the USB switch.

Please refer to FIG. 3. The USB switch 18 has a first control pin 186, a common end 184 and two option ends 182, 183. That is, either of the two option ends 182, 183 can be selectively connected to the common end 184. The USB hub 13 is coupled to the common end 184 and one of the two option ends 182, 183 is coupled to the controller 11. The other option end 183 is coupled to the second USB connector. The USB hub 13 and the second USB connector 181 are used for linking the USB devices 3 and the external computer 6, respectively. The first control pin 186 is coupled to the controller 11. As a result, the USB hub 13 can be connected to either of the second USB connector 181 and the controller 11 by an operation of the changing switch 112 through the first control pin 186.

When the USB hub 13 is connected to the second USB connector 181, the USB devices 3 connected with the USB hub 13 are temporarily exclusively linked to the external computer 6 to which the second USB connector 181 is connected. When the USB hub 13 is connected to the controller 11, the USB devices 3 connected with the USB hub 13 are temporarily exclusively linked to the controller 11 to be finally connected with the smartphone 2.

The USB devices 3 can be categorized into human interface devices (HIDs) and storages. For example, the HIDs may be a keyboard and mouse, and the storages may be a hard disk drive and flash drive. The two wireless links are used for separately connecting the HIDs and storages.

Figure 6:
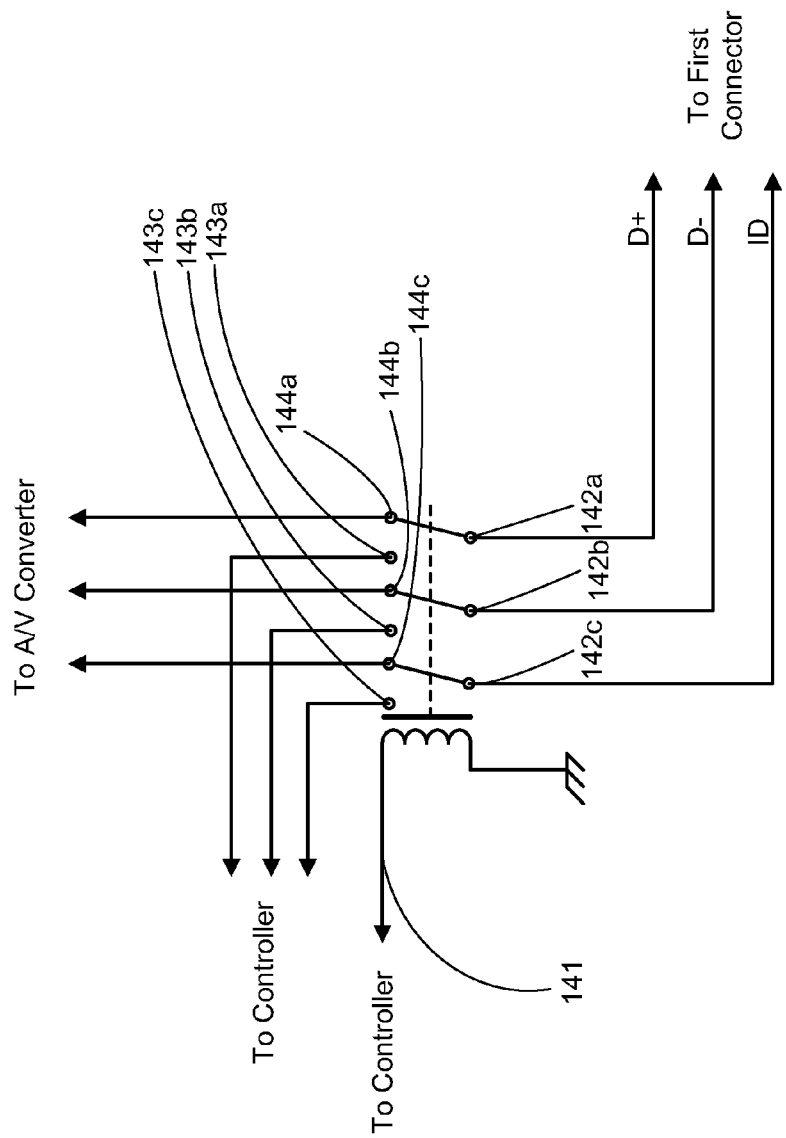
FIG. 6 is a schematic view of a first embodiment of the relay.
Figure 7:
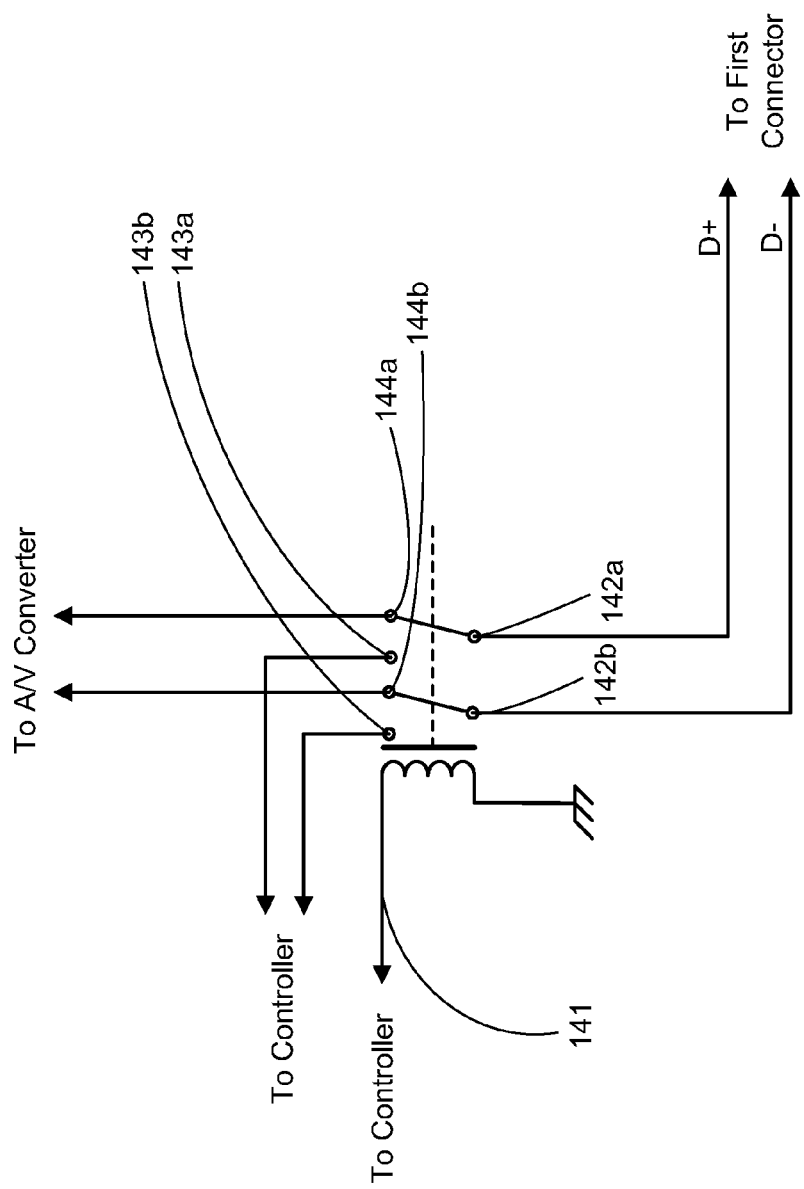
FIG. 7 is a schematic view of a second embodiment of the relay.

Please refer to FIGS. 2, 6 and 7. The relay 14 has a control terminal 141 and multiple rows of change-over contacts. Preferably, the multiple rows are two or three in number because there are two or three pins that are needed to be switched when the first USB connector is a USB connector, namely, D+ and D− pins or D+, D− and ID pins. In other words, the relay 14 is of a double pole double throw (DPDT) type or a three pole double throw (3PDT) type. FIGS. 6 and 7 show the 3PDT typed relay 14 and the 2PDT typed relay 14, respectively. Each row of change-over contacts includes a common terminal 142a, 142b and 142c, a normally-open contact 143a, 143b and 143c, and a normally-closed contact 144a, 144b and 144c. The control terminal 141 and the normally-open contacts 143a, 143b and 143c are coupled to the controller 11. The first USB connector 15 is a USB receptacle and coupled to the common terminals 142a, 142b and 142c for connecting the smartphone 2.

Figure 4:
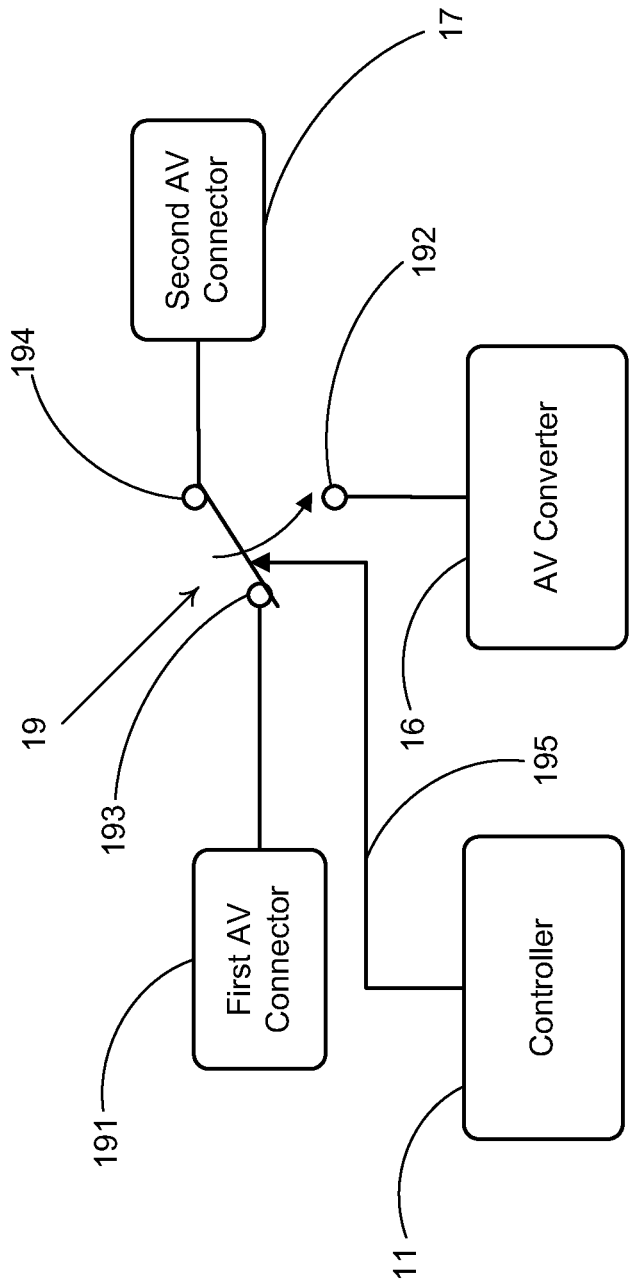
FIG. 4 is a schematic view showing the wiring of the AV switch.

Please refer back to FIGS. 2 and 4. The AV converter 16 is coupled to the normally-closed contacts 144a, 144b and 144c of the relay 14 for converting first AV data into second AV data. The first AV data comes from the mobile AV interface abovementioned and from the smartphone 2. Preferably, the second AV data is compliant with the High-Definition Multimedia Interface (HDMI) standard. The AV switch 19 has a second control pin 195, an AV output 194 and two Av inputs 192, 193. The first and second AV connectors 191, 17 are of an HDMI type. The second AV connector 17 is coupled to the AV output 194 and the AV converter 16 is coupled to one of the two AV inputs 192, 193. The other AV input 193 is coupled to the first AV connector 17. As a result, either of the AV converter 16 and the first AV connector 17 can be selectively connected to the second AV connector 17. The second control pin 195 is coupled to the controller 11. As a result, the second AV connector 17 can be connected to either of the AV converter 16 and the first AV connector 191 by an operation of the changing switch 112 through the second control pin 186.

When the AV converter 16 is connected to the second AV connector 17, the second AV data is being output through the second AV connector 17 to the display 4 with a cable corresponding to the second AV connector 17. When the first AV connector 17 is connected to the second AV connector 17, a third AV data from the external computer 6 to which the first AV connector 191 is connected is being output through the second AV connector 17 to the display 4.

The changing switch 112 connected to the controller 11 may be a normally-open push-button switch. The USB switch 18 and the AV switch 19 are synchronously controlled by a single operation of the changing switch 112 through two control pins 186, 195 connected to the controller 11. When the USB switch 18 connects the second USB connector 181 to the USB hub 13 and the AV switch 19 connects the first AV connector 191 to the second AV connector 17, the USB devices 3 connected to the USB hub 13 and the display 4 connected to the second AV connector 19 are used by the external computer 6. That is, the invention serves as a KVM switch. Alternatively, the changing switch 112 can be omitted by combining its function into the linking switch 111. In detail, these two different switching functions can be distinguished by two different operations, for example, momentarily pressing and long pressing.

Figure 5:
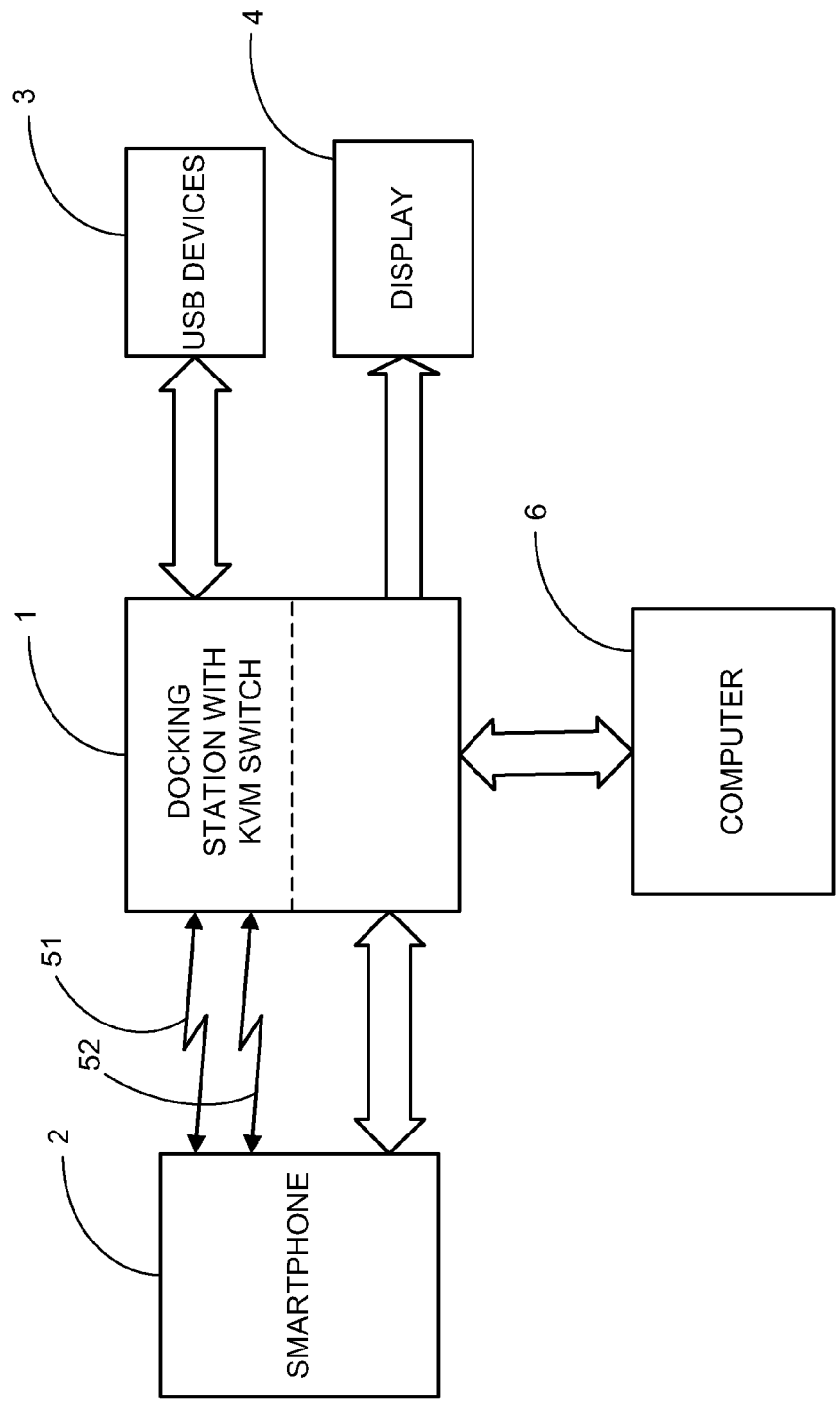
FIG. 5 is a schematic view showing the data flow of the invention.

Please refer to FIGS. 2 and 5. When the USB switch 18 connects the USB hub 13 to the controller 11, the AV switch 19 connects the AV converter 16 to the second AV connector 17, and the smartphone 2 and the display 4 have been connected to the first USB connector 15 and the second AV connector 17, respectively, the relay 14 normally connects the first USB connector 15 to the AV converter 16 for transferring the first AV data from the smartphone 2 to the second AV connector 17. That is, the first AV data from the smartphone 2 can be constantly shown on the display 17. At this time, the first USB connector 15 serves as an AV input port. When a user wants to link USB devices 3 with the smartphone 2, the USB devices 3 have to be connected to the USB hub 13. The controller 11 sends a control signal to the relay 14 through the control terminal 141 to switch the relay 14 while the linking switch 111 is being operated. And then the controller 11 links the smartphone 2 connected to the first USB connector 15 and functions as a USB device of the smartphone 2 to obtain information of the smartphone 2, and finally the wireless communication module 12 establishes the two wireless links 51, 52 with the smartphone 2. One of the two wireless links 51, 52, namely, the BLUETOOTH, serves as an exclusive communication channel for USB HIDs. The other one of the wireless links 51, 52, namely, the Wi-Fi, serves as another exclusive communication channel for USB storages. At this time, the first USB connector 15 is switched to serve as a USB port, the controller 11 temporarily serves as a USB device of the smartphone 2 to obtain information of the smartphone 2, and finally the wireless communication module 12 makes data transfer between the USB devices 3 and the smartphone 2 through the wireless links 51 and 52. After the wireless links 51 and 52 have been established and the linking switch 111 is not operated, the relay 14 connects the first USB connector 15 to the AV converter 16 again.

Figure 8:
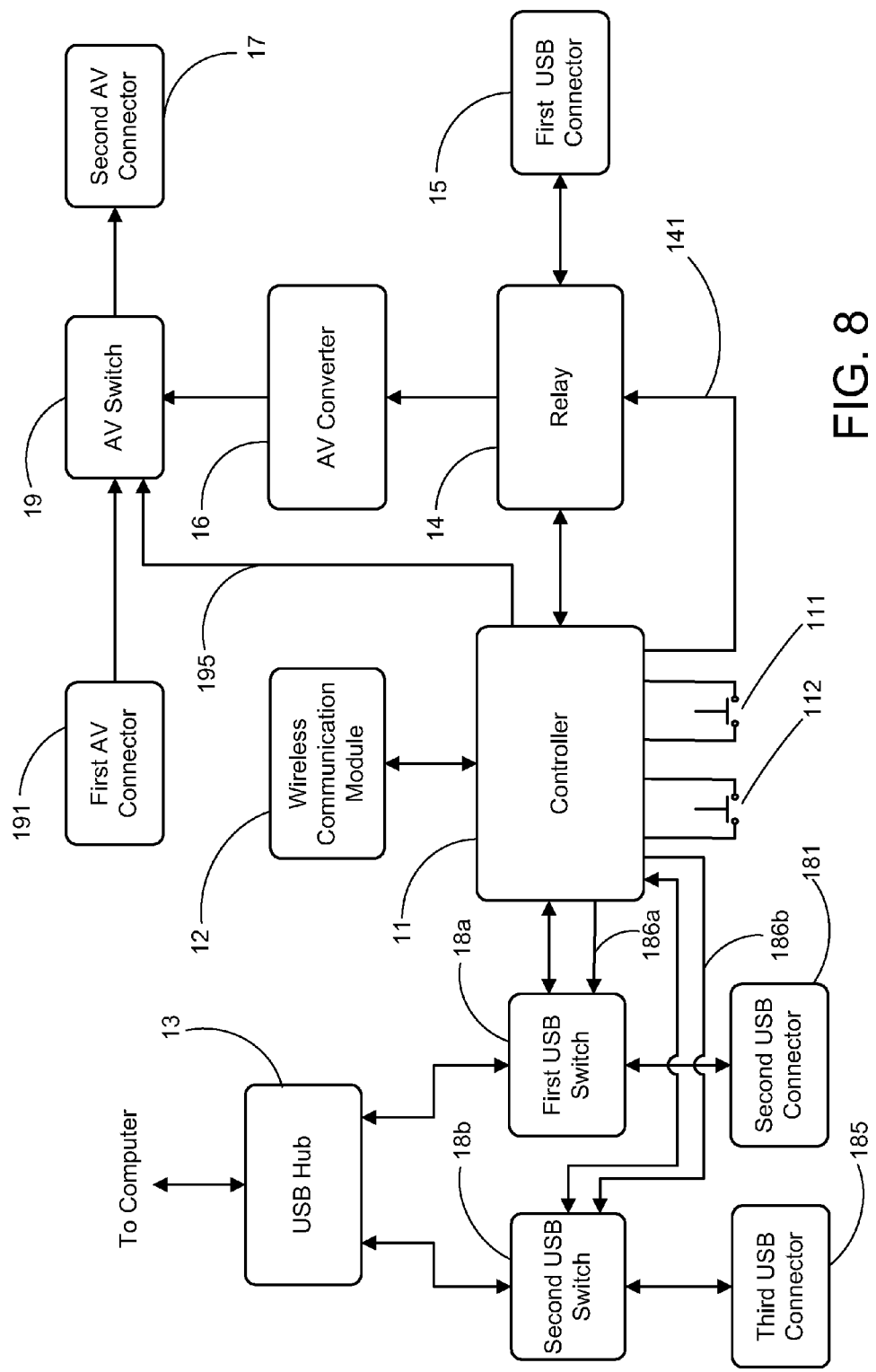
FIG. 8 is a block diagram of the second embodiment of the invention.

FIG. 8 shows another arrangement of the second USB connector 181, USB switch 18 and USB hub 13. In this embodiment, there are two USB switches, namely, a first USB switch 18a and a second USB switch 18b, and two USB connectors, namely, a second USB connector 181 and a third USB connector 185. Each of the first and second USB switches 18a, 18b has a control pin 186a, 186b, a common end and two option ends as shown in FIG. 3. One of the two option ends of each USB switch 18a, 18b is coupled to the USB hub 13. The other one of the two option ends of each USB switch 18a, 18b is coupled to the controller 11. The common ends of the USB switches 18a, a8b are separately coupled to the second and third USB connectors 181, 185. The second and third USB switches 18a, 18b can be synchronously controlled by the controller 11 through the control pins 186a, 186b while the changing switch 112 is being operated. The second and third USB connectors 181, 185 are separately used to connect a keyboard and a mouse. By switching the first and second USB switches 18a, 18b, the keyboard and mouse connected to the second and third USB connectors 181, 185 can be selectively connected to the controller 11 or the USB hub 13. The arrangement of FIG. 8 is completely equivalent to FIG. 2 in function. The combination of USB hub 13, USB switch(es) 18, 18a, 18b and USB connector(s) 181, 185 can be rated as a USB switch box with multiple electric arrangements.

Figure 9:
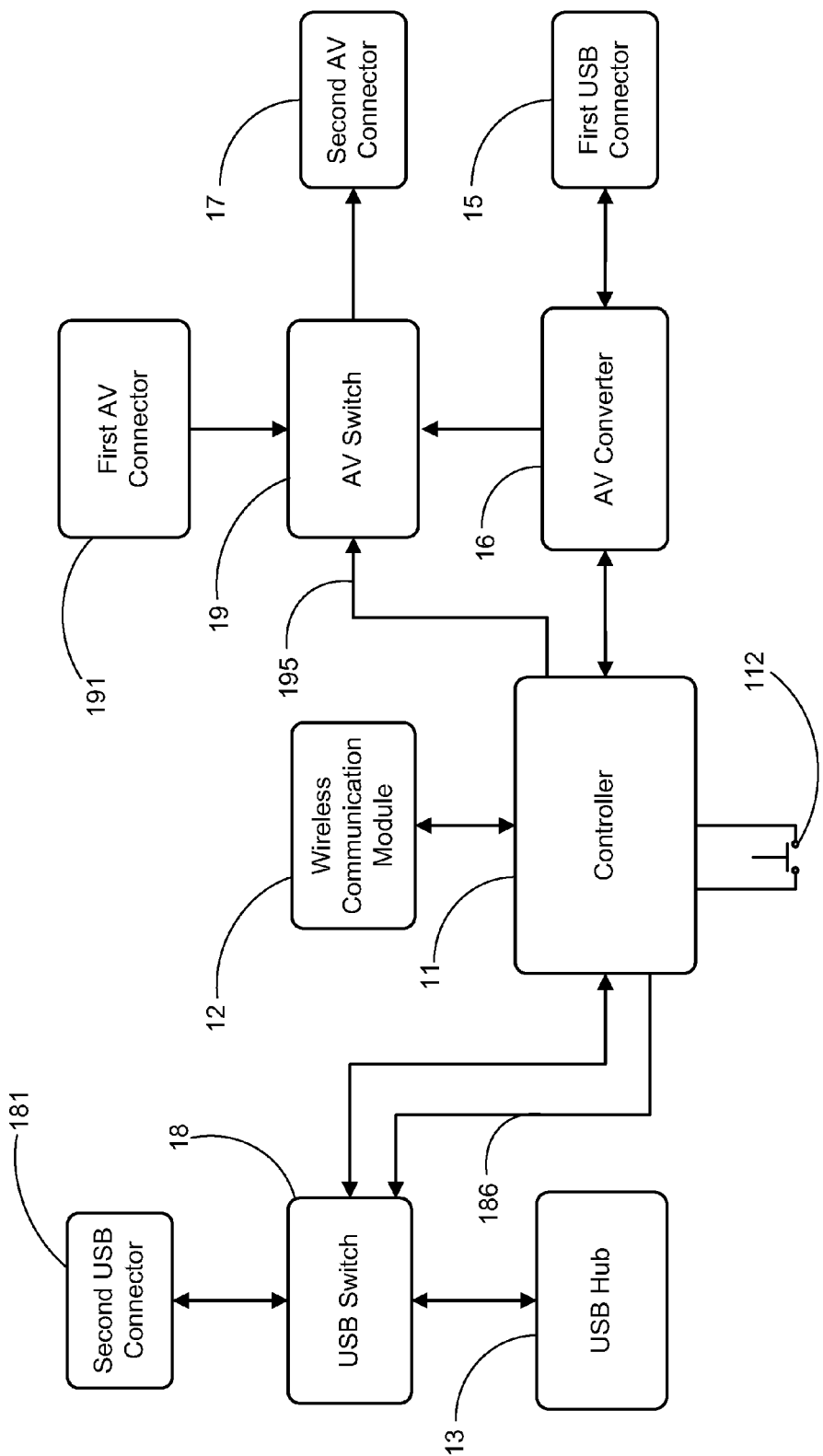
FIG. 9 is a block diagram of the third embodiment of the invention.

Alternately, the relay 14 may be omitted to save production costs. As shown in FIG. 9, the AV converter 16 is directly coupled between the controller 11 and the first USB connector 15 and the rest are the same as the embodiment shown in FIG. 2. Omitting the relay 14 means that the smartphone 2 can output the first AV data through the first USB connector 15 to the AV converter 16 only. In this embodiment, the wireless link between the USB devices 3 connected to the USB hub 13 and the smartphone 2 has to be implemented by a manual operation because the smartphone 2 cannot make a USB connection with the controller 11. Also, the linking switch 111 is omitted but the changing switch 112 remains.

Figure 10:
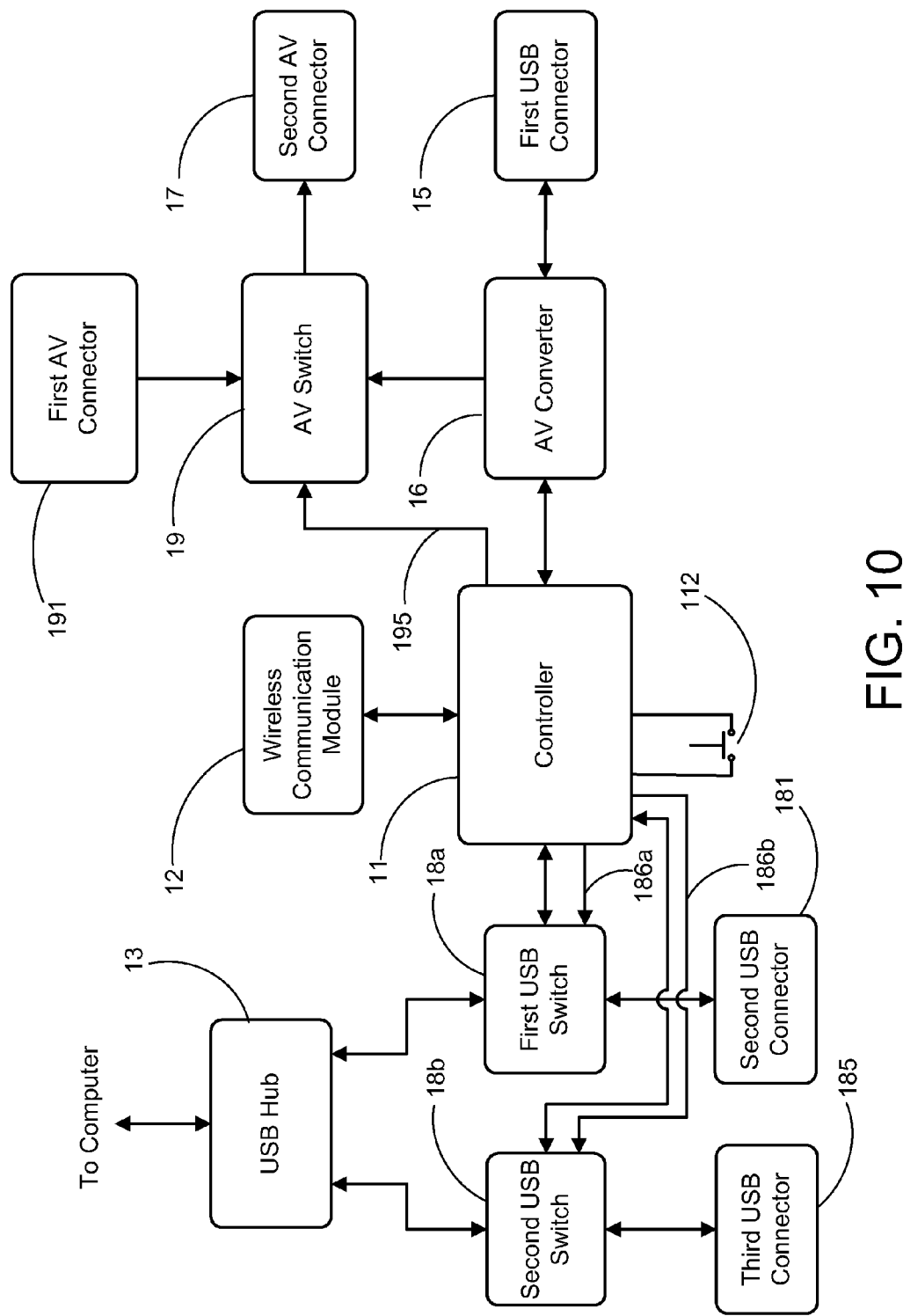
FIG. 10 is a block diagram of the fourth embodiment of the invention.

FIG. 10 shows another arrangement of the second USB connector 181, USB switch 18 and USB hub 13, which is similar to the embodiment shown in FIG. 8. In this embodiment, there are two USB switches, namely, a first USB switch 18a and a second USB switch 18b, and two USB connectors, namely, a second USB connector 181 and a third USB connector 185. Each of the first and second USB switches 18a, 18b has a control pin 186a, 186b, a common end and two option ends as shown in FIG. 3. One of the two option ends of each USB switch 18a, 18b is coupled to the USB hub 13. The other one of the two option ends of each USB switch 18a, 18b is coupled to the controller 11. The common ends of the USB switches 18a, a8b are separately coupled to the second and third USB connectors 181, 185. The second and third USB switches 18a, 18b can be synchronously controlled by the controller 11 through the control pins 186a, 186b while the changing switch 112 is being operated. The second and third USB connectors 181, 185 are separately used to connect a keyboard and a mouse. By switching the first and second USB switches 18a, 18b, the keyboard and mouse connected to the second and third USB connectors 181, 185 can be selectively connected to the controller 11 or the USB hub 13. The arrangement of FIG. 10 is completely equivalent to FIG. 9 in function. The combination of USB hub 13, USB switch(es) 18, 18a, 18b and USB connector(s) 181, 185 can be rated as a USB switch box with multiple electric arrangements.

It will be appreciated by persons skilled in the art that the above embodiments have been described by way of example only and not in any limitative sense, and that various alterations and modifications are possible without departure from the scope of the invention as defined by the appended claims.

What is claimed is:

1. A docking station comprising:
   a controller, having a linking switch;
   a wireless communication module, coupled to the controller, and being configured to establish at least one wireless link with an external portable electronic device;
   a relay, having a control terminal and multiple rows of change-over contacts, wherein each row of change-over contacts has a common terminal, a normally-open contact and a normally-closed contact, and the control terminal and the normally-open contacts are coupled to the controller;
   a first universal serial bus (USB) connector, coupled to the common terminals of the relay for connecting the external portable electronic device;
   a USB switch, having a common end and two option ends for switching either of the two option ends to the common end, and one of the option ends being coupled to the controller;
   a USB hub, coupled to the common end of the USB switch for linking an external USB device;
   a second USB connector, coupled to another one of the two option ends of the USB switch for connecting USB signals from an external computer;
   an audio/video (AV) converter, coupled to the normally-closed contacts of the relay for converting first AV data into second AV data;
   an AV switch, having two AV inputs and an AV output for switching one of the two AV inputs to the AV output, and one of the two AV inputs being coupled to the AV converter;
   a first AV connector, coupled to another one of the two AV inputs of the AV switch for inputting a third AV data from the external computer; and
   a second AV connector, coupled to the AV output of the AV switch for outputting either of the second AV data and the third AV data;
   wherein the relay normally connects the first USB connector to the AV converter for transferring the first AV data from the external portable electronic device to the AV converter, the controller makes the relay switch through the control terminal while the linking switch is being operated, and then the controller links the external portable electronic device connected to the first USB connector, and the wireless communication module establishes the at least one wireless link with the external portable electronic device.

2. The docking station of claim 1, wherein the linking switch is a push-button switch.

3. The docking station of claim 1, wherein the at least one wireless link is one in number.

4. The docking station of claim 3, wherein the wireless link is a BLUETOOTH link or a Wi-Fi link.

5. The docking station of claim 3, further comprising a wireless adapter coupled to the USB hub.

6. The docking station of claim 5, wherein the wireless adapter is a BLUETOOTH adapter or a Wi-Fi adapter.

7. The docking station of claim 1, wherein the at least one wireless link is two in number.

8. The docking station of claim 7, wherein the two wireless links are a BLUETOOTH link and a Wi-Fi link.

9. The docking station of claim 1, wherein the first AV data is compliant with either of a Mobile High-Definition Link (MHL) standard or a Mobility DisplayPort (MyDP) standard.

10. The docking station of claim 1, wherein the second AV connector and the second AV data are compliant with a High-Definition Multimedia Interface (HDMI) standard.

11. The docking station of claim 1, wherein the relay is of a two pole double throw (DPDT) type.

12. The docking station of claim 1, wherein the relay is of a three pole double throw (3PDT) type.

13. The docking station of claim 1, further comprising a changing switch coupled to the controller, the USB switch further comprising a first control pin coupled to the controller, and the AV switch further comprising a second control pin, wherein the USB switch and the AV switch are synchronously controlled by an operation of the changing switch through the first and second control pins.

14. The docking station of claim 13, wherein the changing switch is a push-button switch.

15. The docking station of claim 13, wherein the changing switch is omitted by combining its function into the linking switch.

16. The docking station of claim 15, wherein two different switching functions are performed by two different operations.

17. A docking station comprising:
a controller, having a linking switch;
a wireless communication module, coupled to the controller, and being configured to establish at least one wireless link with an external portable electronic device;
a relay, having a control terminal and multiple rows of change-over contacts, wherein each row of change-over contacts has a common terminal, a normally-open contact and a normally-closed contact, and the control terminal and the normally-open contacts are coupled to the controller;
a first universal serial bus (USB) connector, coupled to the common terminals of the relay for connecting the external portable electronic device;
a first USB switch, having a common end and two option ends for switching either of the two option ends to the common end, and one of the option ends being coupled to the controller;
a second USB switch, having a common end and two option ends for switching either of the two option ends to the common end, and one of the option ends being coupled to the controller;
a USB hub, coupled to another option ends of the first and second USB switches;
a second USB connector, coupled to the common end of the first USB switch for connecting an external USB device;
a third USB connector, coupled to the common end of the second USB switch for connecting another external USB device;
an audio/video (AV) converter, coupled to the normally-closed contacts of the relay for converting first AV data into second AV data;
an AV switch, having two AV inputs and an AV output for switching one of the two AV inputs to the AV output, and one of the two AV inputs being coupled to the AV converter;
a first AV connector, coupled to another one of the two AV inputs of the AV switch for inputting a third AV data from the external computer; and
a second AV connector, coupled to the AV output of the AV switch for outputting either of the second AV data and the third AV data;
wherein USB devices connected to the second and third USB connectors are selectively connected to the controller or the USB hub by switching the first and second USB switches, the relay normally connects the first USB connector to the AV converter for transferring the first AV data from the external portable electronic device to the AV converter, the controller makes the relay switch through the control terminal while the linking switch is being operated, and then the controller links the external portable electronic device connected to the first USB connector, and the wireless communication module establishes the at least one wireless link with the external portable electronic device.

18. The docking station of claim 17, further comprising a changing switch coupled to the controller, the USB switch further comprising a first control pin coupled to the controller, and the AV switch further comprising a second control pin, wherein the USB switch and the AV switch are synchronously controlled by an operation of the changing switch through the first and second control pins.

19. A docking station comprising:
a controller, having a changing switch;
a wireless communication module, coupled to the controller, and being configured to establish at least one wireless link with an external portable electronic device;
a first universal serial bus (USB) connector for connecting the external portable electronic device;
a USB switch box, having a first control pin, and coupled to the controller for selectively connecting an external USB device to the controller or an external computer;
an audio/video (AV) converter, coupled between the first USB connector and the controller for converting first AV data into second AV data;
an AV switch, having a second control pin, two AV inputs and an AV output for switching one of the two AV inputs to the AV output, and one of the two AV inputs being coupled to the AV converter;
a first AV connector, coupled to another one of the two AV inputs of the AV switch for inputting a third AV data from the external computer; and
a second AV connector, coupled to the AV output of the AV switch for outputting either of the second AV data and the third AV data;
wherein the wireless communication module establishes the at least one wireless link with the external portable electronic device, and the USB switch box and the AV switch are synchronously controlled by an operation of the changing switch of the controller through the first and second control pins.

20. The docking station of claim 19, wherein the USB switch box comprises:
- a USB switch, having a common end and two option ends for switching either of the two option ends to the common end, and one of the option ends being coupled to the controller;
- a USB hub, coupled to the common end of the USB switch; and
- a second USB connector, coupled to another one of the two option ends of the USB switch for connecting USB signals from an external computer.

21. The docking station of claim 19, wherein the USB switch box comprises:
- a first USB switch, having a common end and two option ends for switching either of the two option ends to the common end, and one of the option ends being coupled to the controller;
- a second USB switch, having a common end and two option ends for switching either of the two option ends to the common end, and one of the option ends being coupled to the controller;
- a USB hub, coupled to another option ends of the first and second USB switches;
- a second USB connector, coupled to the common end of the first USB switch; and
- a third USB connector, coupled to the common end of the second USB switch.

* * * * *